US011288046B2

(12) United States Patent
Chen et al.

(10) Patent No.: US 11,288,046 B2
(45) Date of Patent: Mar. 29, 2022

(54) METHODS AND SYSTEMS FOR PROGRAM OPTIMIZATION UTILIZING INTELLIGENT SPACE EXPLORATION

(71) Applicant: INTERNATIONAL BUSINESS MACHINES CORPORATION, Armonk, NY (US)

(72) Inventors: Tong Chen, Yorktown Heights, NY (US); Li Zhang, Yorktown Heights, NY (US); Hyojin Sung, Ossining, NY (US); Tian Jin, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 16/669,316

(22) Filed: Oct. 30, 2019

(65) Prior Publication Data

US 2021/0132922 A1    May 6, 2021

(51) Int. Cl.
*G06F 8/41*       (2018.01)
*G06F 11/34*      (2006.01)
*G06F 11/30*      (2006.01)

(52) U.S. Cl.
CPC .......... *G06F 8/4434* (2013.01); *G06F 8/4442* (2013.01); *G06F 11/302* (2013.01); *G06F 11/3409* (2013.01)

(58) Field of Classification Search
CPC .. G06F 8/4434; G06F 8/4442; G06F 11/3409; G06F 11/302
See application file for complete search history.

(56) References Cited

U.S. PATENT DOCUMENTS

| | | | | | |
|---|---|---|---|---|---|
| 6,134,710 | A  * | 10/2000 | Levine | ................ | G06F 11/3409 717/130 |
| 7,181,723 | B2 * | 2/2007 | Luk | ....................... | G06F 8/4442 717/109 |
| 7,496,908 | B2 * | 2/2009 | DeWitt, Jr. | ......... | G06F 11/3466 717/154 |
| 8,069,440 | B2 * | 11/2011 | Tirumalai | ........... | G06F 9/45525 717/169 |
| 8,387,026 | B1 * | 2/2013 | Hundt | ..................... | G06F 8/443 717/151 |
| 8,543,907 | B1 * | 9/2013 | Roskind | .................. | G06F 8/443 715/234 |
| 8,918,771 | B2 * | 12/2014 | Dunn | .................. | G06F 9/45508 717/136 |

(Continued)

OTHER PUBLICATIONS

Anonymously, "An Extensible Method for Incremental Compilation and Translation of Code Snippets in Non-Lexical Context Using an Existing Compiler for a Compatible Language" IPCOM000205848D; IPCOM Publication Date Apr. 6, 2011. (7 Pages).

(Continued)

*Primary Examiner* — Matthew J Brophy
(74) *Attorney, Agent, or Firm* — Griffiths & Seaton PLLC

(57) ABSTRACT

Embodiments for program optimization are provided. A program is compiled with respect to a performance result utilizing a set of parameters. Information associated with the compiling of the program is collected. The collected information is external to the performance result. The set of parameters is changed based on the collected information.

21 Claims, 8 Drawing Sheets

(56) References Cited

U.S. PATENT DOCUMENTS

| | | | |
|---|---|---|---|
| 9,043,788 B2* | 5/2015 | Garrett | G06F 11/3414 |
| | | | 718/1 |
| 9,116,720 B2* | 8/2015 | Dunn | G06F 8/41 |
| 9,134,978 B1* | 9/2015 | Roskind | G06F 8/443 |
| 9,390,260 B2 | 7/2016 | Tan et al. | |
| 9,760,352 B2* | 9/2017 | Nakashima | G06F 8/4452 |
| 9,921,859 B2* | 3/2018 | Mars | G06F 8/443 |
| 9,952,958 B2* | 4/2018 | Hadar | G06F 16/951 |
| 10,209,963 B2 | 2/2019 | Hutchison | |
| 10,223,141 B2* | 3/2019 | Mars | G06F 8/443 |
| 10,353,679 B2* | 7/2019 | Mahaffey | G06F 11/3466 |
| 10,372,430 B2* | 8/2019 | Chung | G06N 20/10 |
| 2003/0005423 A1* | 1/2003 | Chen | G06F 11/3476 |
| | | | 714/E11.204 |
| 2004/0243981 A1* | 12/2004 | Luk | G06F 8/4442 |
| | | | 717/130 |
| 2005/0155026 A1* | 7/2005 | DeWitt | G06F 11/348 |
| | | | 714/E11.2 |
| 2008/0127134 A1* | 5/2008 | Tirumalai | G06F 9/45525 |
| | | | 717/151 |
| 2011/0067018 A1 | 3/2011 | Kawachiya et al. | |
| 2012/0124560 A1* | 5/2012 | Indukuru | G06F 8/443 |
| | | | 717/127 |
| 2012/0198469 A1* | 8/2012 | Bellows | G06F 11/3442 |
| | | | 718/104 |
| 2013/0080761 A1* | 3/2013 | Garrett | G06F 11/3428 |
| | | | 713/100 |
| 2014/0059334 A1* | 2/2014 | Indukuru | G06F 11/3471 |
| | | | 712/244 |
| 2016/0048380 A1* | 2/2016 | Nakashima | G06F 8/443 |
| | | | 717/160 |
| 2016/0124728 A1* | 5/2016 | Mahaffey | G06F 11/3466 |
| | | | 717/158 |
| 2016/0170727 A1* | 6/2016 | Mars | G06F 9/4552 |
| | | | 717/148 |
| 2017/0249172 A1* | 8/2017 | Mars | G06F 8/443 |
| 2018/0218276 A1* | 8/2018 | Suman | G06F 11/3433 |
| 2018/0373510 A1* | 12/2018 | Chung | G06F 8/4441 |
| 2021/0049465 A1* | 2/2021 | Bogdan | G06N 3/08 |

OTHER PUBLICATIONS

Anonymously, "Method for Using Intelligent Compilation for Efficient Implementation of a Dynamic Tracing Tool", IPCOM000220508D; IPCOM Publication Date Aug. 2, 2012, (3 Pages).

Anonymously, "Automatic Adaptive Performance Tuning of Runtime Library Functions", IPCOM000225924D; IPCOM Publication Date Mar. 13, 2013, (5 Pages).

Cavazos, "Intelligent Compilers", Computer and Information Sciences Department, University of Delaware 103 Smith Hall, Newark, DE, USA, (9 Pages).

Triantafyllis, S. et al.; "Compiler Optimization—Space Exploration", Journal of Instruction-Level Parallelism 7 (2005) 1-25, (25 Pages).

* cited by examiner

METHODS AND SYSTEMS FOR PROGRAM OPTIMIZATION UTILIZING INTELLIGENT SPACE EXPLORATION

BACKGROUND OF THE INVENTION

Field of the Invention

The present invention relates in general to computing systems, and more particularly, to various embodiments for program optimization utilizing intelligent space exploration.

Description of the Related Art

Program (or software) optimization is the process of modifying (or creating) a program (or software system) to make it more efficient or use fewer resources. For example, a computer program may be optimized so that it executes more rapidly, is capable of operating with less memory storage or other resources, or uses less power. Generally, a program can not be optimized in absolute terms but only with respect to particular performance characteristics (or results or goals), which may be in conflict with other performance characteristics. As a result, optimized systems are typically only optimal with respect to one characteristic and/or with respect to the utilization thereof for particular applications or users.

In many instances, optimization is performed utilizing an optimizing compiler, which may attempt to construct the program in such a way to, for example, minimize execution time, attain a memory requirement, limit power consumption, etc. In order to perform this task, appropriate parameters must be utilized during the compilation and/or execution process, such as transformation parameters, transformation sequence, thread affinity/scheduling for parallel code, etc. In order to identify the optimal parameters, a space exploration process may be utilized which includes a "compile, execute, result" analysis in which the desired performance characteristic is monitored (or observed), and then utilized to change the parameters (e.g., which are then applied to the compilation and/or execution process). This process may consume considerable resources (e.g., with respect to time and/or costs).

SUMMARY OF THE INVENTION

Various embodiments for program optimization, by a processor, are provided. A program is compiled with respect to a performance result utilizing a set of parameters. Information associated with the compiling (and/or execution) of the program is collected. The collected information is external to the performance result. The set of parameters is changed based on the collected information (e.g., and then applied to the compilation and/or execution process).

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
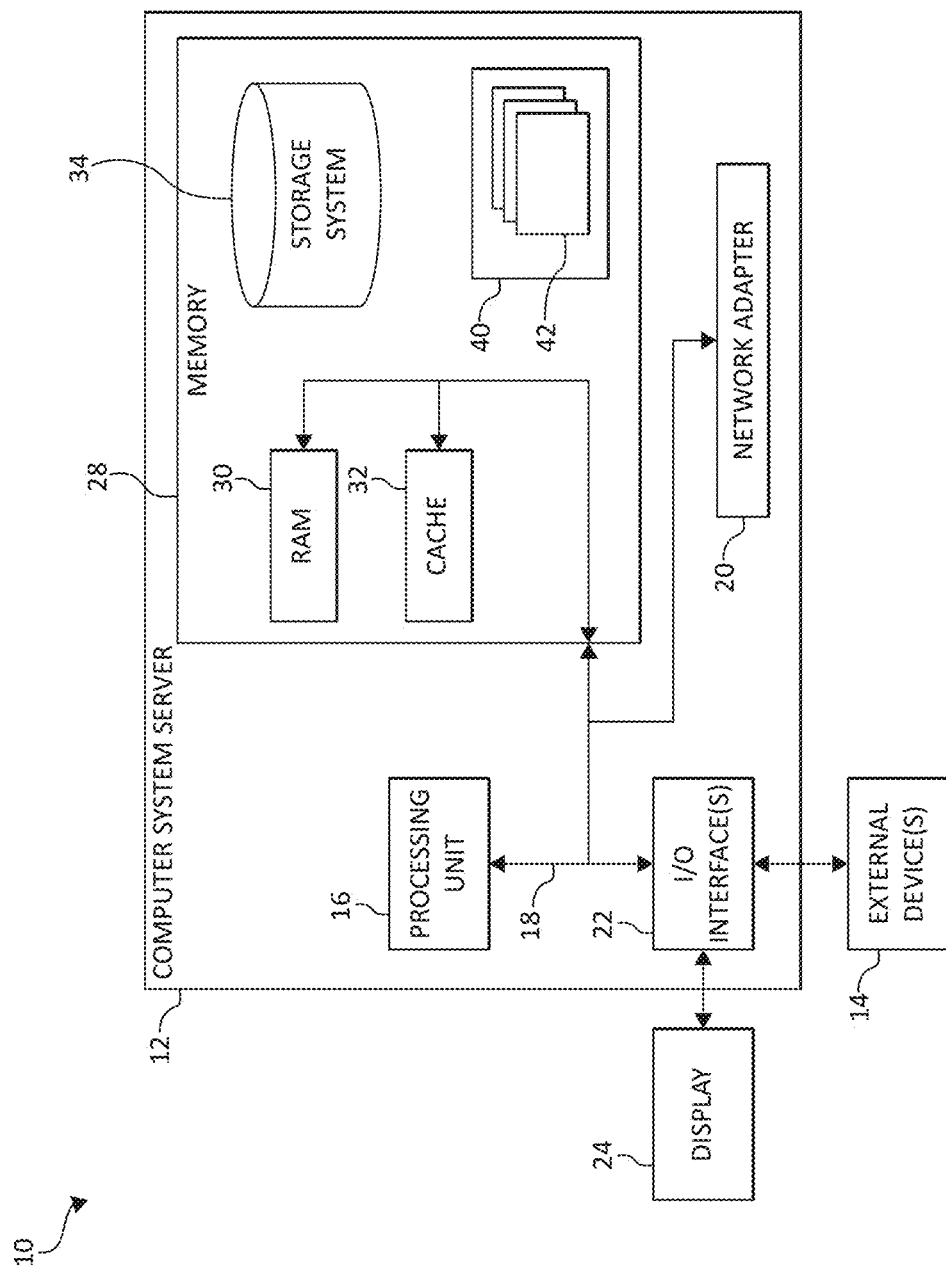
FIG. 1 is a block diagram depicting an exemplary computing node according to an embodiment of the present invention.

As discussed above, program (or software) optimization is the process of modifying (or creating) a program (or software system) to make it more efficient or use fewer resources. For example, a computer program may be optimized so that it executes more rapidly, is capable of operating with less memory storage or other resources, or uses less power. Generally, a program can not be optimized in absolute terms but only with respect to particular performance characteristics (or results or goals), which may be in conflict with other performance characteristics.

As a result, optimized systems are typically only optimal with respect to one characteristic and/or with respect to the utilization thereof for particular applications or users. In many instances, optimization is performed utilizing an optimizing compiler, which may attempt to construct the program in such a way to, for example, minimize execution time, attain a memory requirement, limit power consumption, etc.

In order to perform this task, appropriate parameters must be utilized during the compilation and/or execution process, such as transformation parameters (e.g., tile size, loop unrolling factor, loop transformations, etc.), transformation sequence, thread affinity/scheduling for parallel code, etc. The different number of possible parameters is often so large that a "brute force" search (or exploration) is often considered to be impractical, and generally, no precise analytical models are available. Approaches utilized may include heuristic methods and space exploration techniques.

More specifically, a space exploration process may be utilized which includes a "compile, execute, result" analysis in which the desired performance characteristic is monitored (or observed) and then utilized to change the parameters (e.g., which are then applied to the compilation and/or execution process). This process may be referred to as iterative compilation, adaptive compilation, or autotuning. Search methods utilized during such a process may include or utilize, for example, "greedy" algorithms/methods, genetic algorithms, Bayesian optimization, Monte Carlo searches, "hill climbing," annealing techniques, etc. Such processes may consume considerable resources (e.g., with respect to time and/or costs).

To address these needs and/or the shortcomings in the prior art, in some embodiments described herein, methods and/or systems are disclosed that, for example, provide improved space exploration for program optimization (and/or improved program/software optimization) utilizing information external to (or other than, in addition to, etc.) the performance goal (or result, characteristic, output, etc.) of the optimization process.

More specifically, in some embodiments, additional information and/or information other than the performance result is utilized in the optimization process (e.g., utilized in the search/exploration, identifying optimization parameters, changing optimization parameters, etc.). The information utilized may be collected (or retrieved, monitored, observed, etc.) from the compiler and/or runtime (and/or performance counter and/or execution process). Examples of information that may be utilized from the compiler include (and/or may be associated with), but are not limited to, instruction types and distribution, instruction categories, instruction count, program size, loop nests, variable reference features (e.g., read/write and reuse factor and distance), code layout, instruction schedule, and/or parallelism. Examples of information that may be utilized from runtime (and/or execution) include (and/or may be associated with), but are not limited to, execution stalls, cache behavior (e.g., cache misses), function unit occupancy, communication traffic, instruction dispatch, speculation failure, instructions issued/completed, and/or I/O throughput.

In some embodiments, two models are (or a two-part model is) generated and utilized (e.g., to explore the space). A first model may relate (or associate) the (previous, original, etc.) optimization parameters (or program features) to the additional information (or observation), and a second model may relate (or associate) the additional information to the performance result. As a result, the structure of the search space may be improved (e.g., "smoothed"), providing better guidance to the search and/or increasing the ease and/or speed of finding an optimal solution (i.e., optimization parameters). Additionally, the applicability of transfer learning may be increased (e.g., insight gained during one optimization may be utilized for other optimizations/programs).

In some embodiments, the additional information to be utilized (or monitored, etc.) is selected as a metric that is relatively sensitive to changes made in the parameters (or optimizations) and/or has a relatively high impact on the target value (or performance goal). The selection of the information to be utilized may be performed utilizing, for example, domain expertise (e.g., based on the knowledge of users, programmers, etc.) and/or a data driven method, such as correlation analysis or principal component analysis (PCA) (or another cognitive analysis or machine learning technique). For example, performance counter metric may be selected for memory bound and computation bound instances, while tiling usually affects memory and unrolling affects computation. As another example, cache misses may be utilized (i.e., depending on what level of cache miss has significant implications for particular applications). In some embodiments, the information is selected such that a function that relates the information to the optimization parameters (e.g., $Z=g(X)$, where Z corresponds to the additional information and X corresponds to the optimization parameters) may be approximately decomposed into smaller functions (e.g., $Z_i=g_i(Xg_i)$, where $Xg_i$ is a subset of X).

As such, in some embodiments, the methods and/or systems described herein may utilize a "cognitive analysis," "cognitive system," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s), or with respect to the embodiments described herein, program optimization, as described herein. Utilizing the models, the performance (or operation) of the system (e.g., utilizing/based on new inputs) may be predicted and/or the performance of the system may be optimized by investigating how changes in the input(s) effect the output(s). Feedback received from (or provided by) users and/or administrators may also be utilized, which may allow for the performance of the system to further improve with continued use.

In particular, in some embodiments, a method for program optimization, by a processor, is provided. A program is compiled with respect to a performance result utilizing a set of parameters. Information associated with the compiling (e.g., the compilation and/or execution) of the program is collected. The collected information is external to the performance result. The set of parameters is changed based on the collected information.

The collected information may include at least one of compiler information and runtime (and/or execution) information. If the collected information includes compiler information, the compiler information may be associated with at least one of program size, category of instruction, and instruction count. If the collected information includes runtime information, the runtime information may be associated with at least one of cache misses and I/O throughput.

The changing of the set of parameters may be based on the collected information and the performance result. A first model relating the set of parameters to the collected information may be generated. A second model relating the performance result to the collected information may be generated. A space exploration may be performed in the collected information domain utilizing the first model and the second model. The changing of the set of parameters may be based on the space exploration. The program may be compiled utilizing the changed set of parameters (e.g., which are applied to the compilation and/or execution process).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. However, in some embodiments, some of the components depicted in FIG. 1 may be located in a computing device in, for example, a satellite, such as a Global Position System (GPS) satellite. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
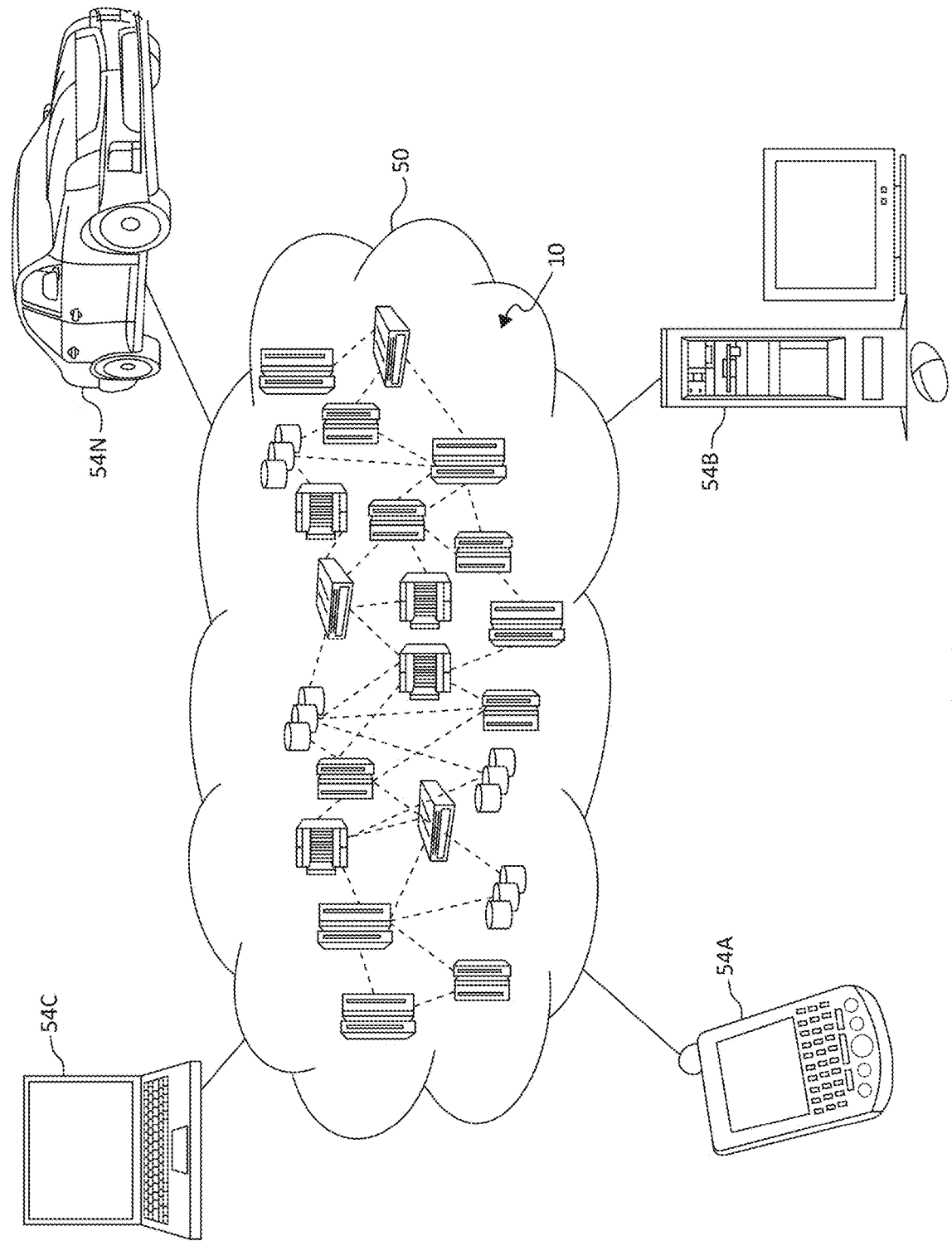
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular (or mobile) telephone or PDA 54A, desktop computer 54B, laptop computer 54C, and vehicular computing system (e.g., integrated within automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
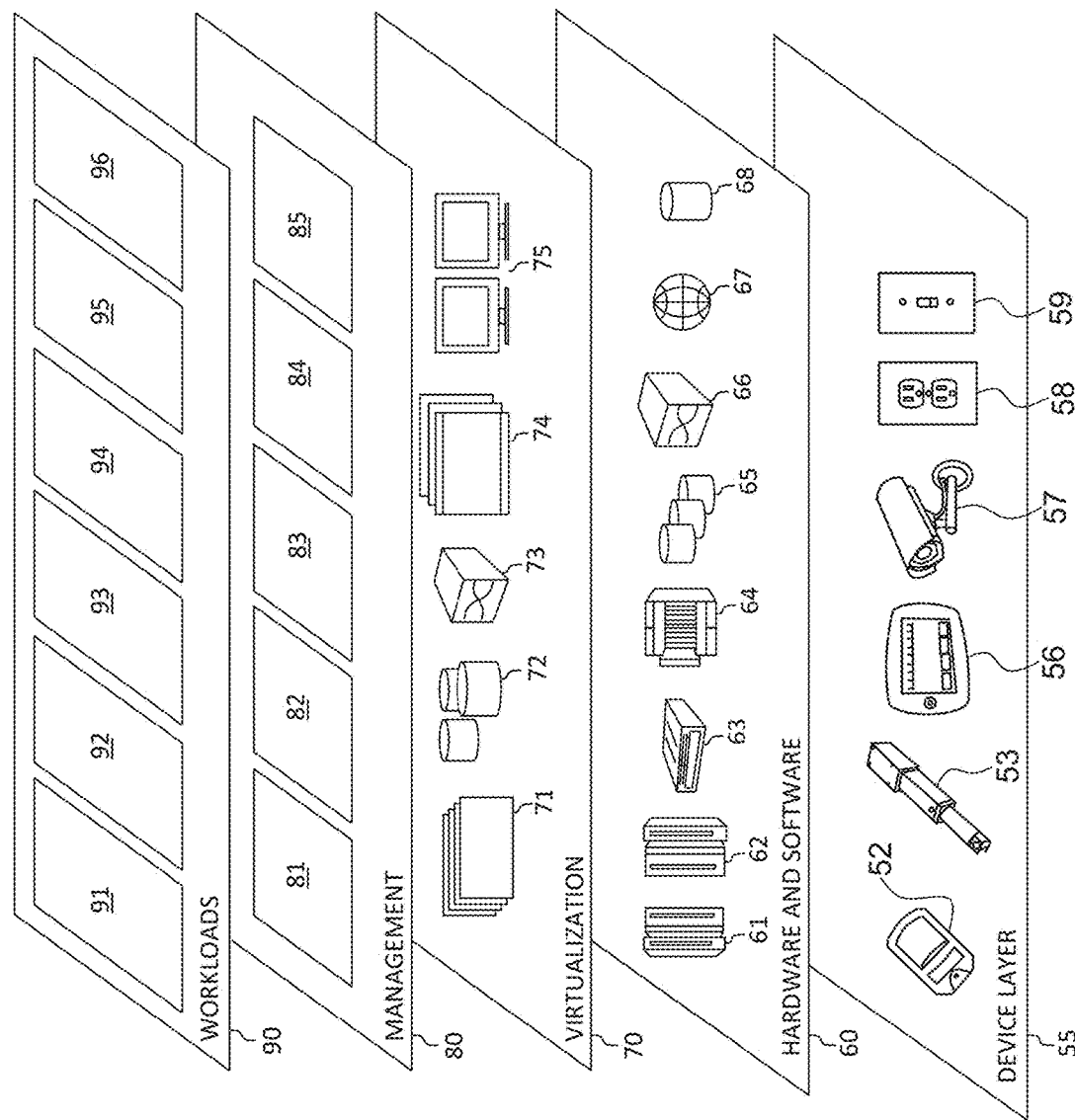
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator, washer/dryer, or air conditioning unit, and a wide variety of other possible interconnected devices/objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for program optimization, as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, in some embodiments, methods and/or systems are provided for improved program optimization (and/or improve space exploration for program optimization). In some embodiments, rather than (only) monitoring and/or utilizing the performance goal (or result) of the optimization process to change the optimization parameters, information external to (or other than, in addition to, etc.) the performance goal is collected (and/or monitored, tracked, etc.) and utilized in the optimization process.

More specifically, in some embodiments, additional information and/or information other than the performance result is utilized in the optimization process (e.g., utilized in searching/exploring the space, identifying optimization parameters, changing optimization parameters, etc.). The information utilized may be collected (or retrieved, monitored, observed, etc.) from the compiler or runtime (and/or performance counter and/or execution). In some embodiments, two models are (or a two part model is) generated and utilized. A first model may relate the (previous, original, etc.) optimization parameters (or program feature) to the additional information (or observation), and a second model may relate the additional information to the performance result. As a result, the structure of the search space may be improved (e.g., "smoothed"), providing better guidance to the search and/or increasing the ease and/or speed of finding an optimal solution (i.e., optimization parameters). Additionally, the applicability of transfer learning may be increased (e.g., insight gained during one optimization may be utilized for other optimizations/programs).

Figure 4:
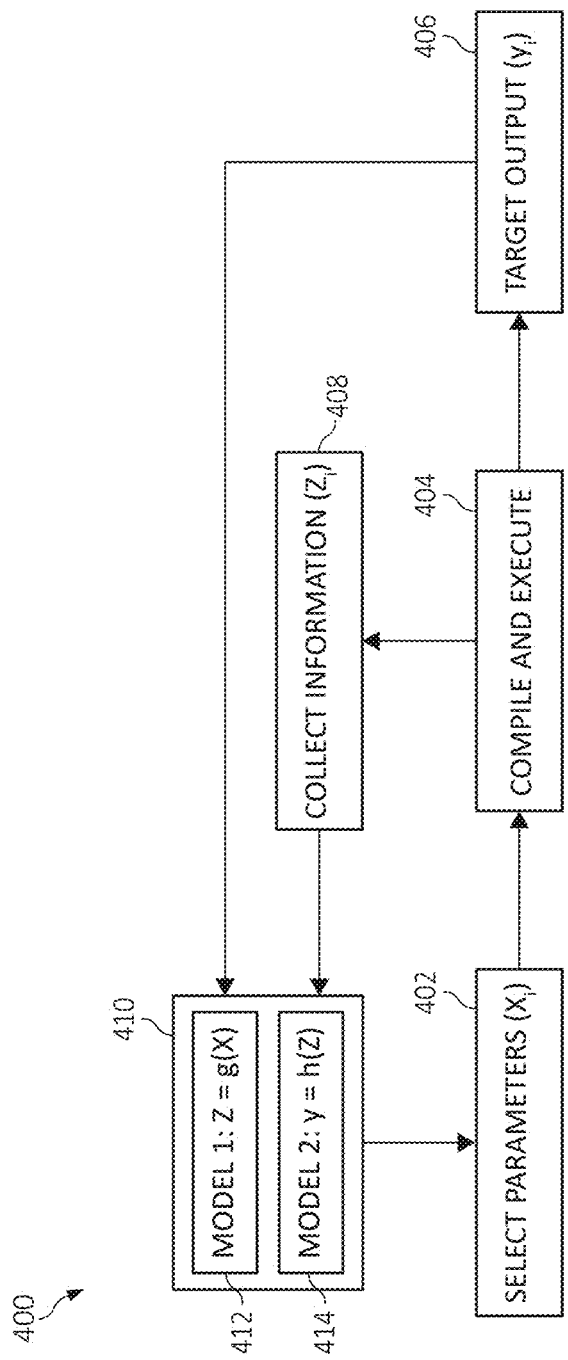
FIG. 4 is a block diagram of a system for program optimization according to an embodiment of the present invention.

FIG. 4 illustrates a system (and/or method) 400 for optimizing a program (or software system) according to an embodiment of the present invention. It should be understood that the system 400 shown in FIG. 4 may repeat the process described below multiple times as the system "searches" for optimal parameters (or transformation, etc.) to compile the program with respect to achieving a selected performance goal (or output), such as execution time. For the sake of simplicity, it may be assumed that the method 400 begins at block 402 with a particular (e.g., initial) set of parameters ($X_i$) being selected.

At block 404, the program is compiled and executed, as will be appreciated by one skilled in the art. As shown, a result of the compilation/execution of the program may include a target output 406 ($y_i$) (or performance result/goal/characteristic, such as execution time) being monitored or detected. In contrast with convention methods in which the target output 406 is solely utilized to make changes to the parameters (e.g., via a model that relates the parameters to the target output), in some embodiments described herein, an additional observation is made and/or additional information it utilized.

More specifically, at block 408 information ($Z_i$) (i.e., additional information, external to the target output 406) is collected (or monitored). The information may be collected (or retrieved, monitored, observed, etc.) from the compiler and/or runtime (or performance counter or execution). Examples of information that may be utilized from the compiler include, but are not limited to, (and/or may be associated with) instruction types and distribution, instruction categories, instruction count, program size, loop nests, variable reference features (e.g., read/write and reuse factor and distance), code layout, instruction schedule, and/or parallelism. Examples of information that may be utilized from runtime include, but are not limited to, (and/or may be associated with) execution stalls, cache behavior (e.g., cache misses), function unit occupancy, communication traffic, instruction dispatch, speculation failure, instructions issued/completed, and/or I/O throughput.

In the example shown, the information collected at block 408 and the target output 406 are sent to (or retrieved by) an analysis module 410. The analysis module 410 may utilize both the collected information and the target output to, for example, conduct a space exploration in the domain of the collected information to select the best point for the collected information and/or identify the best configuration/optimization method (or parameters) to achieve the desired target output 406.

More specifically, in some embodiments, the analysis module 410 generates two models (or a two-part model). In the example shown, the analysis module 410 includes (or generates) a first model 412 and a second model 414. The first model 412 relates the (previous, original, etc.) optimization parameters (or program feature) (e.g., X) to the additional information (or observation) (Z). The second model 414 relates the additional information (Z) to the target output 406 (or performance result) (y). The utilization of the two functions 412 and 414 may allow for the structure of the search space to be improved (e.g., "smoothed"), providing better guidance to the search and/or increasing the ease and/or speed of finding an optimal solution (i.e., optimization parameters). Based on the output of the analysis module 410, the parameters utilized for compiling and/or executing the program (e.g., at block 402) may be changed (or re-selected). The process may then be repeated multiple times (e.g., until the desired target output 406 is achieved).

In some embodiments, information collected at block 408 is selected as, for example, an information type that is relatively sensitive to changes made in the parameters (or optimizations) and/or has a relatively high impact on the target value (or performance goal). The selection of the (additional) information may be performed utilizing, for example, domain expertise (e.g., based on the knowledge of users, programmers, etc.) and/or a data driven method, such as correlation analysis or principal component analysis (PCA) (or another cognitive analysis or machine learning technique).

For example, performance counter metric may be selected for memory bound and computation bound instances, while tiling usually affects memory and unrolling affects computation. As another example, cache misses may be utilized (i.e., depending on what level of cache miss has significant implications for particular applications). In some embodiments, the information is selected such that a function that relates the information to the optimization parameters (e.g., $Z=g(X)$, where Z corresponds to the additional information and X corresponds to the optimization parameters) may be approximately decomposed into smaller functions (e.g., $Z_i=g_i(Xg_i)$, where $Xg_i$ is a subset of X).

As such, in some embodiments, methods and/or systems for intelligent space exploration for program optimization utilizing, for example, additional compiler and/or runtime information are provided. Compiler and/or runtime information may be collected. An analysis may be conducted to select appropriate intermediate runtime (and/or compiler) data (i.e., the additional information). A first functional model relating program/compiler configuration to the intermediate data may be constructed. A second functional model relating a target performance goal to the intermediate data may be constructed. A space exploration in the intermediate data domain may be conducted to select best intermediate data point (e.g., runtime target point) using the second model. A configuration/optimization method (and/or parameters) to achieve the performance goal may be identified or selected using the first model.

Figure 5:
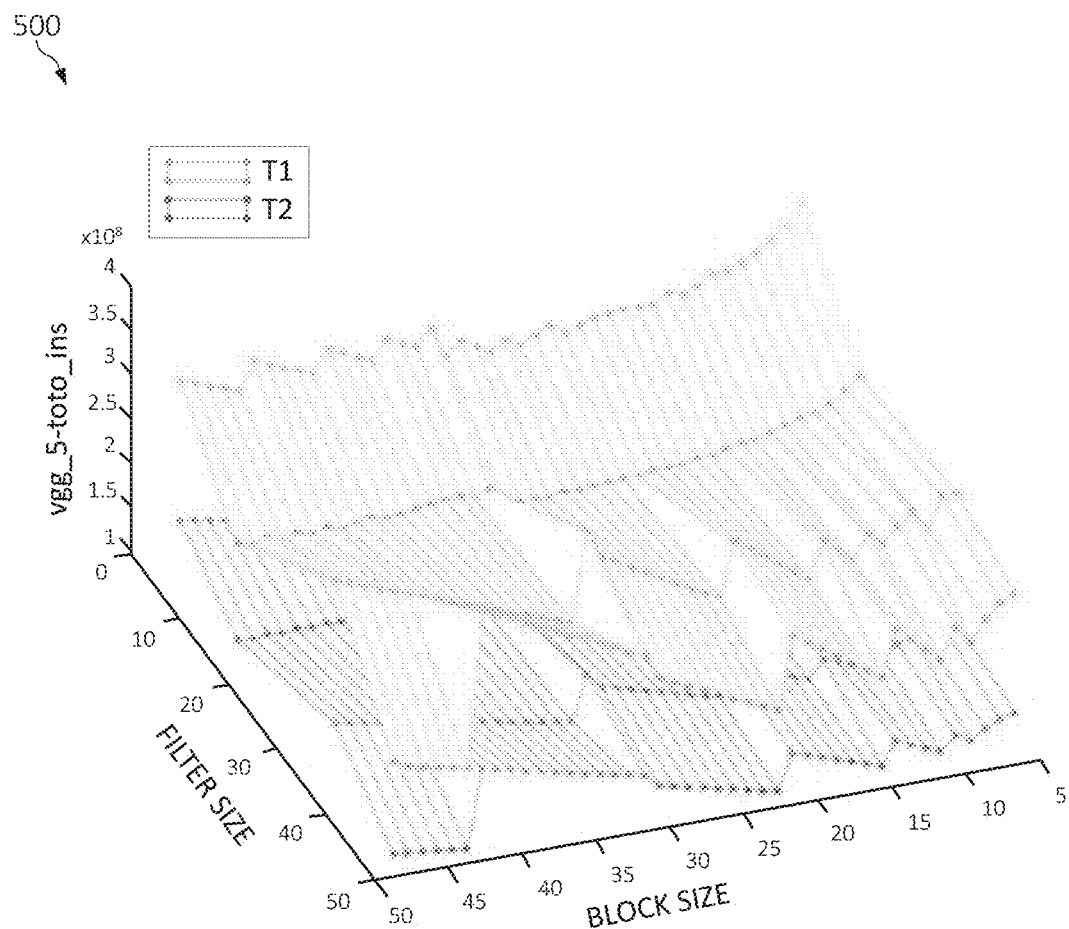
FIGS. 5, 6, and 7 are visual representations of search spaces according to an embodiment of the present invention.
Figure 6:
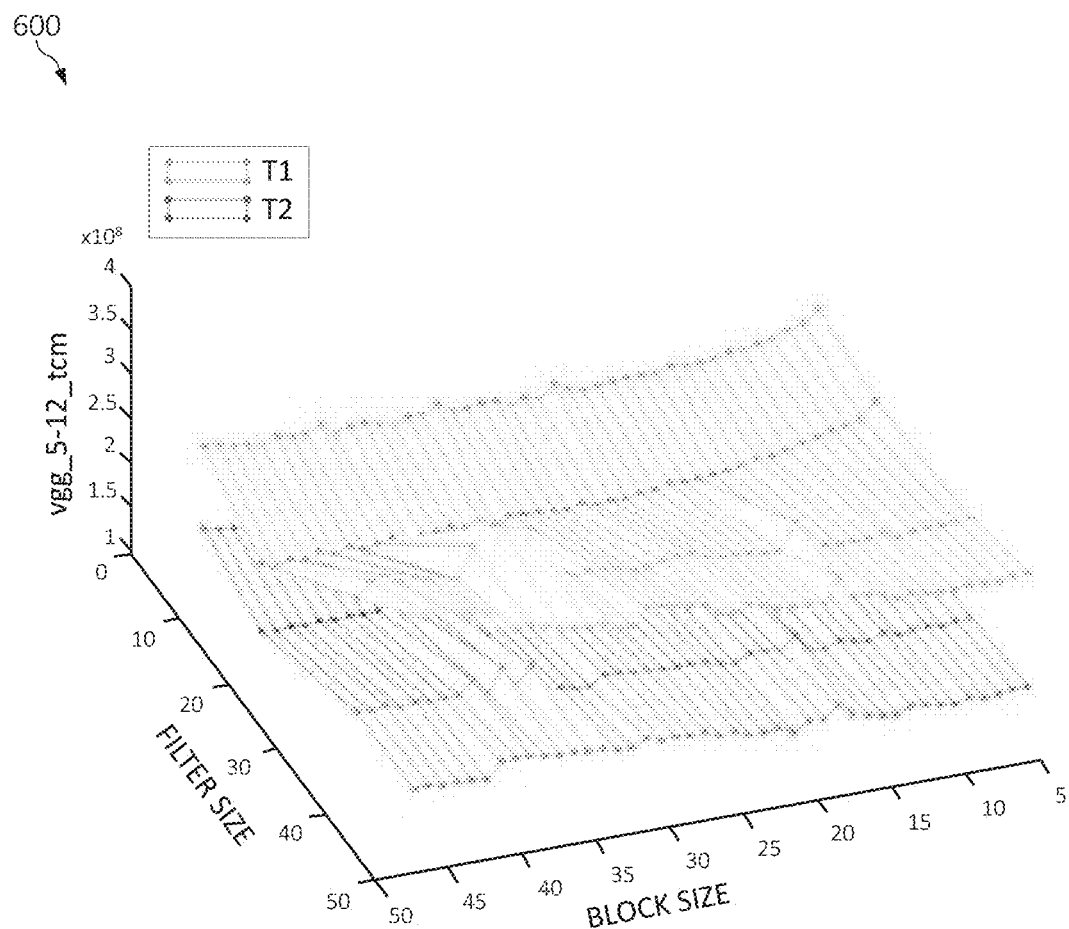
Figure 7:
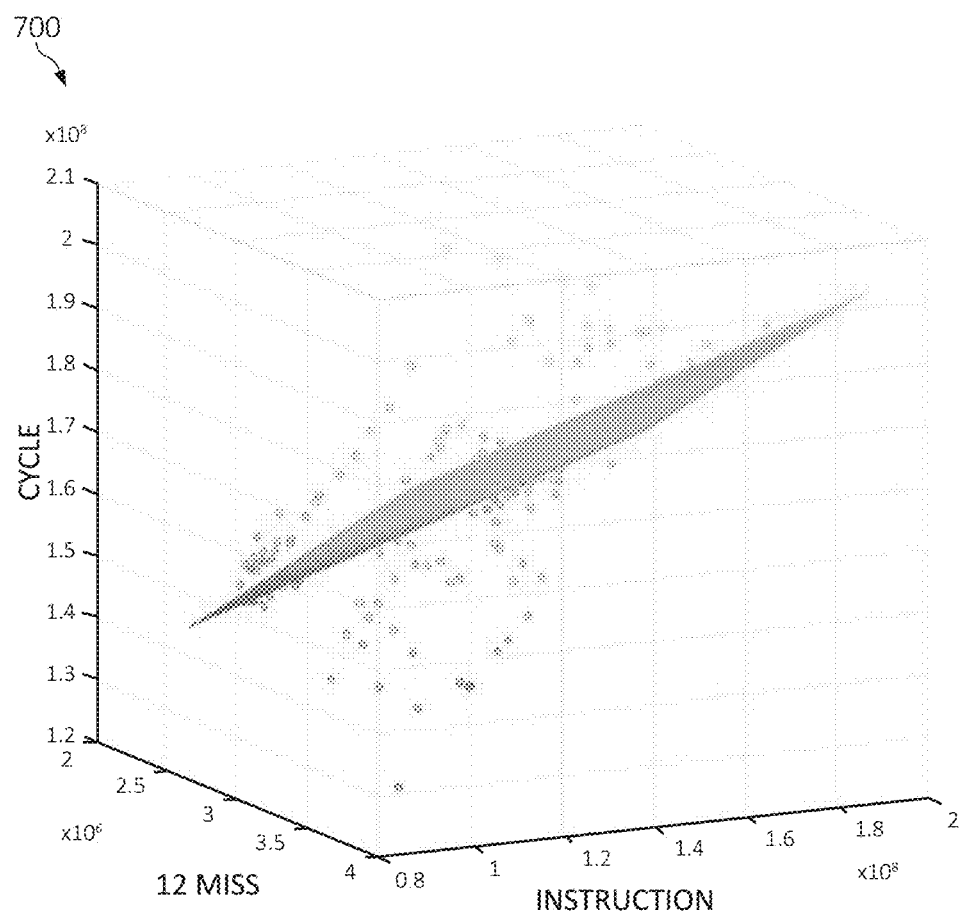

FIGS. 5, 6, and 7 are visual representations of search spaces generated utilizing the methods and systems described herein. In particular, FIG. 5 illustrates a visual representation of a search space 500 generated utilizing a function (g1) that relates particular optimization parameters (X) (e.g., filter size and block size) to instruction count (i.e., a particular additional observation, as described above) (Z). In other words, the function may be expressed as $Z=g1(X)$. FIG. 6 illustrates a visual representation of a search space 600 generated utilizing a function (g2) that relates particular optimization parameters (X) (e.g., filter size and block size) to Level 2 (L2) cache misses (i.e., a particular additional observation, as described above) (Z). In other words, the function may be expressed as $Z=g2(X)$. FIG. 7 illustrates a visual representation of a search space 700 generated utilizing a function (h) that relates the instruction count and L2 cache misses of FIGS. 5 and 6 to a particular target output (or performance goal), in particular, cycles and/or execution time (i.e., y=h(instruction count, L2 cache misses). As will be appreciated by one skilled the art, the structures of the search spaces in FIGS. 5, 6, and 7 are relatively "smooth" and/or "regular" (i.e., compared to search spaces generated utilizing convention methods), and as such, may provide better guidance to the search and/or increasing the ease and/or speed of finding an optimal solution (i.e., optimization parameters).

As mentioned above, the additional observation of, for example, compile/runtime information and the mapping to and from may enhance the structure in the exploring space and facilitate searching. Additionally, the exploration may be assisted utilizing domain knowledge from users or programmers (e.g., insight may be gained through the performance counter). Various methods may be utilized for generating the different functions used, which may be guided by the influence the additional information has on the functions. With an appropriate selection made for the additional information, the function(s) may have a reduced dimension and may further facilitate exploration. Further, the applicability of transfer learning may be increased (e.g., insight gained during one optimization may be utilized for other optimizations/programs).

Figure 8:
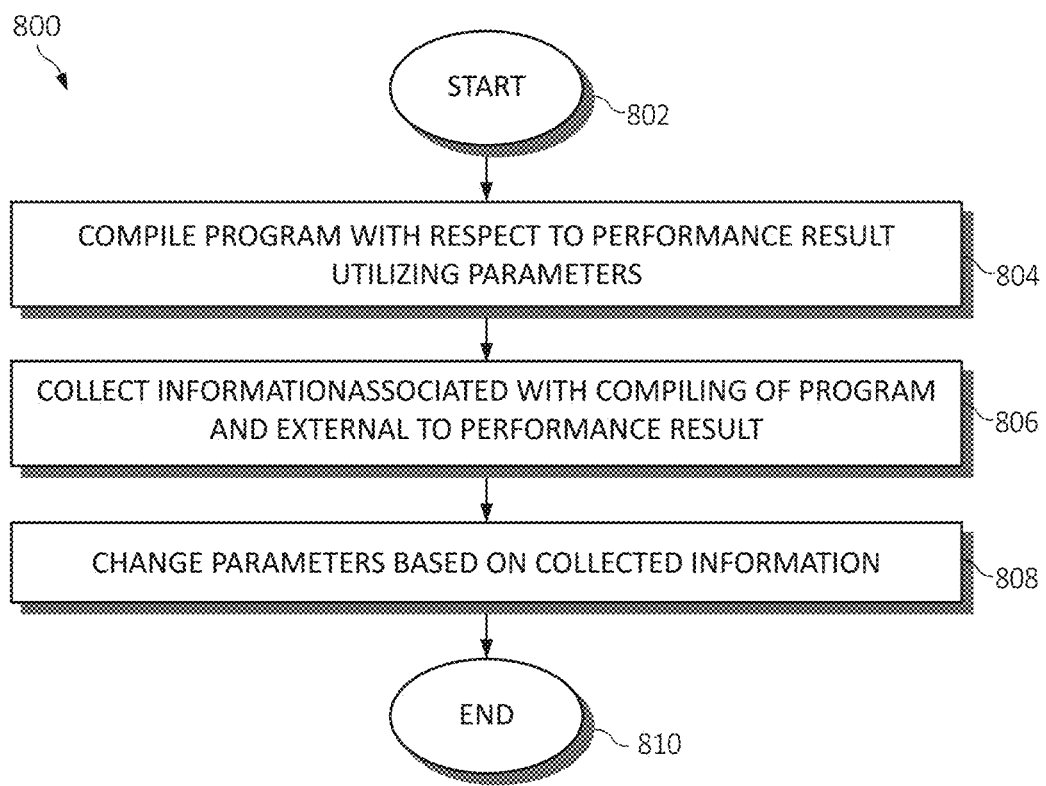
FIG. 8 is a flowchart diagram of an exemplary method for program optimization according to an embodiment of the present invention.

Turning to FIG. 8, a flowchart diagram of an exemplary method 800 for program (or software) optimization is provided. The methods 800 begins (step 802) with, for example, a set (e.g., an initial set) of optimization parameters (and/or transformations) for compiling and/or executing a program being selected. The initial parameters may be selected based on a desired performance result (or goal) and/or target output.

The program is compiled (and/or executed) with respect to the performance result utilizing the set (or initial set) of parameters (step 804). The performance result may include, for example, at least one of execution time, attain a memory requirement, limit power consumption, etc.

Information associated with the compiling (i.e., associated with the compilation and/or execution) of the program is collected (or monitored, observed, etc.) (step 806). The collected information may be external to (or other than, in addition to, etc.) the performance result. In other words, in some embodiments, information besides the desired performance result or goal is collected or observed and utilized in the optimization process, as described herein. The collected information may include at least one of compiler information and runtime (and/or execution) information. If the collected information includes compiler information, the compiler information may be associated with at least one of program size, category of instruction, and instruction count. If the collected information includes runtime information, the runtime information may be associated with at least one of cache misses and data transfer rate (or I/O throughput).

The set of parameters is changed based on the collected information (step 808). The changing of the set of parameters may be based on the collected information and the performance result. In some embodiments, the changing of the parameters (and/or method 800 as a whole) includes generating a first model relating the parameters to the collected information and generating a second model relating the performance result to the collected information. A space exploration in the collected information domain may be performed utilizing the first model and/or the second model, and the changing of the set of parameters may be based on the space exploration.

Method 800 ends (step 810) with, for example, the program being (re)compiled (and/or (re)executed) utilizing the changed set of parameters. The process may then be repeated (i.e., multiple times) utilizing the changed parameters and may continue until the desired performance result is achieved. In some embodiments, feedback from users may be utilized to improve the performance of the system over time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for program optimization, by a processor, comprising:
    compiling a program with respect to a performance result utilizing a set of parameters, wherein the set of parameters is an initial set of parameters used to compile the program to achieve a desired target output associated with the performance result, and wherein the performance result comprises the desired target output as specifically defined by a user;
    collecting information associated with the compiling of the program, wherein the collected information is program characteristic or program behavior information external to the performance result;
    generating a first functional model correlating the set of parameters to the collected information, wherein generating the first model includes correlating only data points of the program characteristic or program behavior information to the initial set of parameters;
    generating a second functional model correlating the performance result to the collected information, wherein generating the second model includes correlating only data points of the program characteristic or program behavior information to the desired target output specifically defined by the user;
    performing a space exploration process on a search space of the first functional model using the second functional model to identify an optimal runtime target point with respect to the program characteristic or program behavior information, wherein, a parameter optimization process is performed using the first functional model to identify optimal parameters for the optimal runtime target point to achieve the performance result; and
    changing the set of parameters based on parameter optimization process.

2. The method of claim 1, wherein the collected information includes at least one of compiler information and runtime information.

3. The method of claim 2, wherein the collected information includes compiler information, and wherein the compiler information is associated with at least one of program size, category of instruction, and instruction count.

4. The method of claim 2, wherein the collected information includes runtime information, and wherein the runtime information is associated with at least one of cache misses and I/O throughput.

5. The method of claim 1, wherein the changing of the set of parameters is based on the collected information and the performance result.

6. The method of claim 5, further comprising performing a space exploration in the collected information domain utilizing the first model and the second model, wherein the changing of the set of parameters is based on the space exploration.

7. The method of claim 1, further comprising compiling the program utilizing said changed set of parameters.

8. A system for program optimization comprising:
    a processor executing instructions stored in a memory device, wherein the processor:
        compiles a program with respect to a performance result utilizing a set of parameters, wherein the set of parameters is an initial set of parameters used to compile the program to achieve a desired target output associated with the performance result, and wherein the performance result comprises the desired target output as specifically defined by a user;
        collects information associated with the compiling of the program, wherein the collected information is program characteristic or program behavior information external to the performance result;
        generates a first functional model correlating the set of parameters to the collected information, wherein generating the first model includes correlating only data points of the program characteristic or program behavior information to the initial set of parameters;
        generates a second functional model correlating the performance result to the collected information, wherein generating the second model includes correlating only data points of the program characteristic or program behavior information to the desired target output specifically defined by the user;
        performing a space exploration process on a search space of the first functional model using the second functional model to identify an optimal runtime target point with respect to the program characteristic or program behavior information, wherein, a parameter optimization process is performed using the first functional model to identify optimal parameters for the optimal runtime target point to achieve the performance result; and
        changes the set of parameters based on the parameter optimization process.

9. The system of claim 8, wherein the collected information includes at least one of compiler information and runtime information.

10. The system of claim 9, wherein the collected information includes compiler information, and wherein the compiler information is associated with at least one of program size, category of instruction, and instruction count.

11. The system of claim 9, wherein the collected information includes runtime information, and wherein the runtime information is associated with at least one of cache misses and I/O throughput.

12. The system of claim 8, wherein the changing of the set of parameters is based on the collected information and the performance result.

13. The system of claim 12, wherein the processor further performs a space exploration in the collected information domain utilizing the first model and the second model, wherein the changing of the set of parameters is based on the space exploration.

14. The system of claim 8, wherein the processor further compiles the program utilizing said changed set of parameters.

15. A computer program product for program optimization, by a processor, the computer program product embodied on a non-transitory computer-readable storage medium having computer-readable program code portions stored therein, the computer-readable program code portions comprising:
    an executable portion that compiles a program with respect to a performance result utilizing a set of parameters, wherein the set of parameters is an initial set of parameters used to compile the program to achieve a desired target output associated with the performance result, and wherein the performance result comprises the desired target output as specifically defined by a user;

an executable portion that collects information associated with the compiling of the program, wherein the collected information is program characteristic or program behavior information external to the performance result;

an executable portion that generates a first functional model correlating the set of parameters to the collected information, wherein generating the first model includes correlating only data points of the program characteristic or program behavior information to the initial set of parameters;

an executable portion that generates a second functional model correlating the performance result to the collected information, wherein generating the second model includes correlating only data points of the program characteristic or program behavior information to the desired target output specifically defined by the user;

an executable portion that performs a space exploration process on a search space of the first functional model using the second functional model to identify an optimal runtime target point with respect to the program characteristic or program behavior information, wherein, a parameter optimization process is performed using the first functional model to identify optimal parameters for the optimal runtime target point to achieve the performance result; and an executable portion that changes the set of parameters based on the parameter optimization process.

16. The computer program product of claim 15, wherein the collected information includes at least one of compiler information and runtime information.

17. The computer program product of claim 16, wherein the collected information includes compiler information, and wherein the compiler information is associated with at least one of program size, category of instruction, and instruction count.

18. The computer program product of claim 16, wherein the collected information includes runtime information, and wherein the runtime information is associated with at least one of cache misses and I/O throughput.

19. The computer program product of claim 15, wherein the changing of the set of parameters is based on the collected information and the performance result.

20. The computer program product of claim 19, wherein the computer-readable program code portions further include an executable portion that performs a space exploration in the collected information domain utilizing the first model and the second model, wherein the changing of the set of parameters is based on the space exploration.

21. The computer program product of claim 15, wherein the computer-readable program code portions further include an executable portion that compiles the program utilizing said changed set of parameters.

* * * * *